United States Patent [19]

Dexter et al.

[11] 4,283,287

[45] Aug. 11, 1981

[54] STABLE NON-CAKING AQUEOUS SLURRY OF SODIUM CHLORATE AND SODIUM CHLORIDE AND METHOD OF MAKING

[75] Inventors: Theodore H. Dexter, Lewiston; Willard A. Fuller, Grand Island, both of N.Y.

[73] Assignee: Hooker Chemicals & Plastics Corp., Niagara Falls, N.Y.

[21] Appl. No.: 103,257

[22] Filed: Dec. 13, 1979

[51] Int. Cl.$^3$ ................. C01B 11/02; C11D 3/395; C11D 7/54; D06L 3/06

[52] U.S. Cl. .......................... 252/187 R; 8/108 A; 162/6; 210/754; 252/95; 252/187 H; 426/318; 426/539

[58] Field of Search ................ 252/187 R, 95, 187 H; 8/108 A; 162/6; 210/754; 426/318, 539

[56] References Cited

U.S. PATENT DOCUMENTS

| | | | |
|---|---|---|---|
| 3,690,845 | 9/1972 | Grotheen | 423/475 |
| 3,829,557 | 8/1974 | Winfield | 252/187 R |

Primary Examiner—Edward A. Miller
Assistant Examiner—Irwin Gluck
Attorney, Agent, or Firm—Howard M. Ellis

[57] ABSTRACT

A flowable, non-caking aqueous slurry of sodium chlorate and sodium chloride having a weight ratio of sodium chloride to sodium chlorate between about 0.55 and 0.65, and, more preferably, about 0.59, is described. The slurry contains a solid phase essentially entirely of sodium chloride. The slurries contain from about 28 to about 33% by weight sodium chlorate, from about 15 to about 21% by weight sodium chloride, and from about 45 to about 58% by weight water.

The slurries are produced by forming an initial aqueous solution of sodium chlorate and sodium chloride containing from about 28 to about 50% by weight sodium chlorate and from about 0 to about 14% by weight sodium chloride and subsequently adding sufficient sodium chloride to obtain a slurry containing from about 28 to about 33% by weight sodium chlorate, from about 15 to about 21% by weight sodium chloride, and from about 45 to about 58% by weight water.

8 Claims, No Drawings

STABLE NON-CAKING AQUEOUS SLURRY OF SODIUM CHLORATE AND SODIUM CHLORIDE AND METHOD OF MAKING

The present invention relates to stable, economically transportable non-caking aqueous slurries of sodium chlorate and sodium chloride and to a method of making such slurries. The solid or crystalline phase of the present slurries is essentially entirely fine grained sodium chloride. The present slurries are useful as an intermediate, or source, of so-called "R-2 solutions" which, in turn, are useful in the production of chlorine dioxide or mixtures of chlorine dioxide and chlorine. Such products of commercial importance in a number of fields, for example, pulp bleaching, water purification, fat bleaching, removal of phenols from industrial wastes, and textile bleaching. Chlorine dioxide may be generated from sodium chlorate and sodium chloride by various known commercial methods. Generally, these methods involve the reaction of sodium chlorate and sodium chloride and a strong acid, such as sulfuric acid. Such reaction may typically be represented:

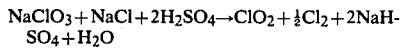

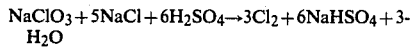

R-2 solutions are aqueous solutions of sodium chlorate and sodium chloride having a chloride to chlorate mole ratio of between about 1.00 and about 1.09 and contain about 60 percent by weight water. R-2 solutions are useful starting materials for processes producing chlorate products or as indicated above in the production of chlorine dioxide or mixtures of chlorine dioxide and chlorine.

Sodium chlorate is commonly produced by electrolysis of an aqueous solution of sodium chloride under conditions which produce a cell liquor containing sodium chlorate and sodium chloride. Although several electrolytic and combination electrolytic and chemical methods are known for producing sodium chlorate, the most common commercial production is by the electrolysis of sodium chloride in an electrolytic cell. Such electrolysis is typically carried out in electrolytic cells without diaphragms. The electrolysis produces chlorine at the anode and hydroxyl ions at the cathode; these react to form hypochlorite, which then converts to sodium chlorate. The cell liquor produced is relatively high in sodium chlorate. Alternatively, the electrolysis may be carried out in a chlor-alkali diaphragm cell wherein chlorine produced at the anode and caustic soda produced in the cathode compartment are combined and reacted apart from the electrolytic cell under conditions which favor the production of a sodium chlorate liquor, hereinafter called "chlorate liquor". Typically, the aqueous cell liquor from chlorate cells contains between about 400 and about 650 gpl (grams per liter) sodium chlorate and between about 100 to about 130 gpl sodium chloride. Preferably, the cell liquor or chlorate liquor suited to use in the present process contains at least about 400 gpl sodium chlorate and at least about 100 gpl sodium chloride.

The present invention relates to the production of intermediate slurry products, suitably produced from an aqueous solution of sodium chloride and sodium chlorate containing from about 28 to about 50 percent by weight sodium chlorate and from about zero to about fourteen percent by weight sodium chloride. Such aqueous solutions are suitably obtained from the electrolysis of sodium chloride to produce a cell liquor or chlorate liquor. The present slurries are flowable and economically transportable, without caking, and are useful to produce R-2 solutions by the simple addition of water. In use the present slurry products are delivered to the plant or mill, typically in a railroad tank car or tank truck, and pumped into a storage tank. The present slurries are flowable at temperatures as low as 20° C. through lines as small as one inch in diameter. Suitably, during unloading the tank car or truck is washed with sufficient water to bring the water content of the solutions in the storage tank to about 60 percent by weight, providing R-2 solution for use in the plant. The present slurries provide a means of lowering transportation costs in that less water is transported.

Aqueous mixtures of sodium chlorate and sodium chloride which contain sufficient amounts of sodium chlorate to be precursors for R-2 solutions are highly susceptible to caking at temperature conditions normally encountered in loading, transporting and storing operations. Heretofore, attempts to provide R-2 concentrates or slurries have been unsuccessful because of the precipitation and subsequent packing of sodium chlorate crystals causing plugging of drain and feed lines.

The present slurry product is produced by adding sodium chloride to cell or chlorate liquor, suitably by initially passing the liquor through a salt bed, or salt saturator, and subsequently adding additional sodium chloride, preferably in a solid form, or in a form that will not substantially add to the water content of the slurry product.

GENERAL DESCRIPTION OF THE INVENTION

The present slurries are aqueous mixtures of sodium chlorate and sodium chloride. The present slurries contain a solid or crystalline phase substantially entirely of finely divided sodium chloride. The present slurry products do not precipitate sodium chlorate crystals, are non-caking, that is, do not form a solid mass, and are flowable at temperatures as low as 20° C. The solid phase, when the proportions of the present slurry composition are maintained, is found to remain stable substantially entirely in the form of finely divided crystals of sodium chloride, generally in the range of from about 100 to about 1000 microns. The ratio of chloride to chlorate is maintained in the R-2 solution range, that is, the weight ratio between sodium chloride and sodium chlorate ranges from about 0.55 to about 0.65 and, most preferably, about 0.59. The present slurries contain from about 28 to about 33 percent by weight sodium chlorate, from about 15 to about 21 percent by weight sodium chloride and from about 45 to about 58 percent by weight water. Based on the preferred R-2 solution weight ratio of 0.59 sodium chloride to sodium chlorate, the sodium chlorate content of the present slurries is preferably adjusted to between about 30 to about 32 percent by weight, and, most preferably, between 31 and 32 percent by weight. Within the foregoing ranges, the solid phase consists substantially entirely of sodium chloride in a finely divided form. The flowability of the present slurry products may be further improved, if such compounds are compatible with subsequent uses of the product, by the addition of from about 0.5 to about 10 parts per million by weight of sodium or potassium ferrocyanide, $Na_4Fe(CN)_6$ or $K_4Fe(CN)_6$ to the product.

R-2 solution may be produced from the present slurries by the addition of water to place the solid sodium chloride in solution and bring the water content to about 60 percent by weight.

The present slurry products are suitably produced by the addition of sodium chloride to the product produced by the electrolysis of an aqueous solution of sodium chloride, e.g., cell or chlorate liquor, to produce a slurry product containing from about 28 to about 33 percent by weight sodium chlorate and from about 15 to about 21 percent by weight sodium chloride. Generally, cell or chlorate liquors contain from about 28 to about 44 percent by weight sodium chlorate and from about eight to about fourteen percent by weight sodium chloride with minor amounts of sodium hypochlorite and sodium dichromate. Suitably, sodium chloride is added to the liquor by adding solid sodium chloride and mixing, or, more practically, by initially bringing the sodium chloride content up by passing the liquor through a salt saturator and subsequently adding additional sodium chloride in solid or slurry form. Preferably, the sodium chloride content is increased by the addition of sodium chloride in solid form. Wet sodium chloride containing less than about 11 percent by weight water is suitably utilized.

DETAILED DESCRIPTION OF THE INVENTION

The following specific examples are to be considered as a preferred mode of carrying out the invention and are not to be considered as limiting or restricting the invention to the mode illustrated:

EXAMPLE 1

An electrolytic chlorate cell operating without a diaphragm was operated at a cell voltage of 3.84 at a temperature of 65° C. and at a current efficiency of 91%, to produce a cell liquor containing 450 gpl sodium chlorate (33.8% by weight) and 120 gpl sodium chloride (9.0% by weight). The cell liquor also contained about four grams per liter of sodium hypochlorite and minor amounts of sodium dichromate. The liquor was subsequently heated to about 90° C. and sufficient urea added to convert the sodium hypochlorite to sodium chloride.

EXAMPLE 2

Sodium chloride was added to the cell liquor of Example 1 by initially passing the liquor through a bed of sodium chloride to obtain a solution containing about 450 gpl sodium chlorate (32.4% by weight) and about 167 gpl sodium chloride (12% by weight). This solution was then butted by adding solid sodium chloride to obtain a slurry containing about 430 gpl sodium chlorate (30.2% by weight) and about 253 gpl sodium chloride (17.8% by weight) with a weight ratio of sodium chloride to sodium chlorate of 0.59. The slurry contains a solid phase consisting essentially entirely of finely divided crystalline sodium chloride. The water content of the slurry was about 51.9% by weight. The slurry was found to be non-caking and stable at temperatures as low as 20° C. The slurry was found to be flowable through lines as small as 1" in diameter.

EXAMPLE 3

The slurry product of Example 2 was loaded into a railroad tank car having a capacity of 180,000 pounds. The slurry was transported over a period of seven days to the point of use. The slurry was unloaded by draining out the bulk of the liquid phase and washing out the solid phase using water in an amount not exceeding that which would give a solution having more than 60% by weight water.

The foregoing description and embodiments are intended to illustrate the invention without limiting it thereby. It will be understood that various modifications can be made in the invention without departing from the spirit or scope thereof.

What is claimed is:

1. A flowable non-caking aqueous slurry stable at 20° C. of sodium chloride and sodium chlorate in a weight ratio ranging from about 0.55 to 0.65 sodium chlorate to 1.0 sodium chloride, said slurry containing from about 28 to about 33 percent by weight sodium chlorate, from about 15 to about 21 percent by weight sodium chloride, and from about 45 to about 58 percent by weight water, said slurry having a solid phase substantially entirely of finely divided sodium chloride.

2. The slurry of claim 1 wherein the weight ratio of sodium chloride to sodium chlorate is about 0.59.

3. The slurry of claim 1 wherein the slurry contains from about 30 to about 32 percent by weight sodium chlorate.

4. The slurry of claim 1 wherein the slurry contains from about 0.5 to about 10 parts by million of sodium or potassium ferrocyanide.

5. A method of making a flowable, non-caking aqueous slurry stable at 20° C. of sodium chlorate and sodium chloride which comprises the steps of:

(a). forming an initial aqueous solution of sodium chlorate and sodium chloride containing from about 28 to about 50 percent by weight sodium chlorate and from about zero to about fourteen percent by weight sodium chloride, (b). adding additional sodium chloride to the solution of step a). to obtain a slurry containing from about 28 to about 33 percent by weight sodium chlorate, from about 15 to about 21 percent by weight sodium chloride, and from about 45 to about 58 percent by weight water, said slurry having a solid phase consisting essentially entirely of finely divided sodium chloride.

6. The method of claim 5 wherein the solution of step a). is the product of an electrolysis of an aqueous solution of sodium chloride.

7. The method of claim 5 wherein the sodium chloride added in step b). is in solid form.

8. The method of claim 5 wherein the sodium chloride added in step b). contains less than about 11 percent by weight water.

* * * * *